United States Patent [19]

Houghton

[11] 4,076,225
[45] Feb. 28, 1978

[54] ADJUSTABLE ENERGY ABSORBING DEVICE PROVIDING LINEAR DECELERATION

[75] Inventor: Benjamin T. Houghton, Batavia, N.Y.

[73] Assignee: Enidine Incorporated, Buffalo, N.Y.

[21] Appl. No.: 741,730

[22] Filed: Nov. 15, 1976

[51] Int. Cl.² .............................................. F16F 9/48
[52] U.S. Cl. .................................... 267/34; 188/285; 188/287; 267/116
[58] Field of Search .............. 267/8 R, 34, 65 R, 116, 267/124, 139; 16/51–53, 66; 188/285, 287, 313

[56] References Cited

U.S. PATENT DOCUMENTS

| 3,059,268 | 10/1962 | McHale | 188/287 X |
|---|---|---|---|
| 3,207,270 | 9/1965 | Ellis | 188/287 |
| 3,446,317 | 5/1969 | Gryglas | 188/287 |
| 3,478,846 | 11/1969 | Germond | 188/285 |
| 3,605,960 | 9/1971 | Singer | 188/287 |
| 3,693,767 | 9/1972 | Johnson | 188/287 X |
| 3,782,710 | 1/1974 | Selke et al. | 267/65 R X |

*Primary Examiner*—Johnny D. Cherry
*Attorney, Agent, or Firm*—Christel & Bean

[57] ABSTRACT

An adjustable kinetic energy absorbing device wherein a piston is moved in response to an applied impact force along within a tube defining a chamber containing hydraulic fluid. The tube has a plurality of orifice openings therein spaced therealong in the direction of movement of the piston, and an elongated path is defined outwardly of the chamber, preferably in the outer surface of the tube, and in fluid communication with the orifice openings. The path is relatively narrow in width and extends along the tube. An elongated flow control element is supported in the device and movable lengthwise along the path in response to manual operation of an adjustment assembly including a cam operatively engaging the elongated element. The flow control element has formations spaced therealong adapted to register with the orifice openings to control flow of hydraulic fluid through the openings in response to movement of the element. A region in the device in fluid communication with the path receives fluid flowing through the orifice openings and along the path in response to movement of the piston.

19 Claims, 10 Drawing Figures

ADJUSTABLE ENERGY ABSORBING DEVICE PROVIDING LINEAR DECELERATION

BACKGROUND OF THE INVENTION

This invention relates to the art of kinetic energy absorbing devices, and more particularly to a new and improved adjustable energy absorbing device providing linear deceleration of a moving object.

One area of use of the present invention is in hydraulic shock absorbers, although the principles of the invention can be variously applied. It is desirable to provide linear deceleration capability in energy absorbing devices of the shock absorber type to avoid subjecting the moving object to high peak force loads. It would be highly advantageous to provide such capability in devices of this type in a manner characterized by simplicity in construction and effectiveness in operation. In addition, it would be highly desirable to provide such cabability in a manner accommodating changes in such factors as weight, speed and moving force associated with the moving object.

The present invention provides an adjustable kinetic energy absorbing device of the type wherein a piston is moved along within a chamber containing hydraulic fluid in response to an applied impact force. The element defining the chamber is provided with a plurality of orifice openings spaced therealong in the direction of movement of the piston, and an elongated path is defined outwardly of the chamber and in fluid communication with the orifice openings. The path is relatively narrow in width and extends along the chamber defining element. Flow control means in the form of an elongated element is adjustably supported in the device and movable by cam means lengthwise along the path in operative relationship with the orifice openings to adjust the effective size of the orifices, the elongated element having spaced formations adapted to register with the openings to provide flow control in response to movement of the element. The device also includes a region in fluid communication with the path for receiving fluid flowing through the orifice openings and along the path.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figure 1:
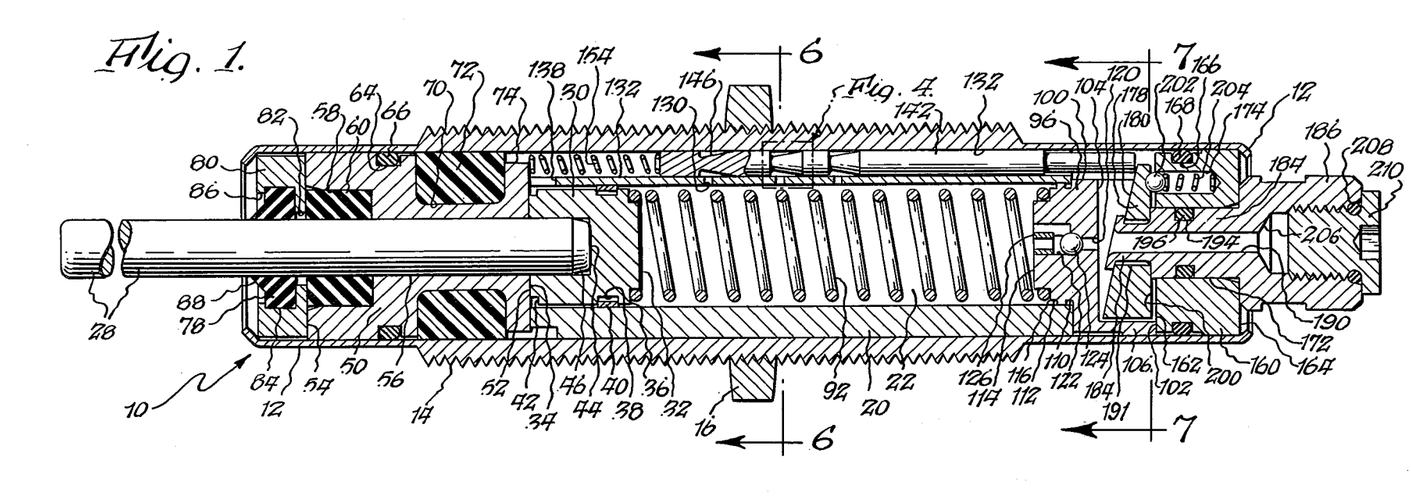
FIG. 1 is a longitudinal sectional view, with parts shown in elevation, of a kinetic energy absorbing device according to the present invention.

Referring now to FIG. 1, the apparatus of the present invention generally designated 10 includes a housing in the form of a relatively thin-walled cylinder or tube 12. The tube 12 is provided with threads 14 along a portion of the axial length thereof spaced inwardly from each of the opposite ends, and a hexagonal nut 16 is connected on threads 14 for use in positioning and mounting the apparatus in a manner which will be described. According to one illustrative mode of assembly, one or both of the opposite ends of tube 12 would be formed to be flared slightly outwardly to facilitate insertion of the remainder of the components of the device whereupon the ends would then be formed to be bent or crimped inwardly as shown in the completed form of the housing 12 in FIG. 1. Other techniques or arrangements could of course be employed to hold the components within tube 12.

The apparatus of the present invention further comprises means including a hollow, elongated element 20 in the form of a cylinder or tube within housing 12 for defining a chamber or region designated 22 for containing hydraulic fluid. The element 20 can be called a shock tube and has an overall axial length substantially less than the overall length of housing 12 and an outer dimension or diameter such that a major portion of the outer surface fits snugly within and contacts the inner surface of housing 12 in a manner which will be described in detail presently. The opposite axial ends of shock tube 20 abut against additional components of the device within housing 12 in a manner which now will be described.

The apparatus of the present invention further comprises piston means having a portion movable along within tube 20 and a portion for receiving external input forces. A piston rod element 28 has a portion extending outwardly from one axial end of housing 12, the left-hand portion as viewed in FIG. 1, and which is disposed so that the longitudinal axis thereof is generally coincident with the common longitudinal axes of the cylindrical housing 12 and tubular element 20. Rod 28 extends along within housing 12 and a piston head element 30 movable within tube 20 is fixed to the inner end of rod 28. Piston head 30 is of generally solid cylindrical form having an outer dimension or diameter such that it fits relatively closely within but is axially movable along within the shock tube element 20. The piston head 30 preferably is of bronze for wear capabilities and has generally parallel opposite axial end faces 32, 34. A shoulder 36 is formed around the periphery of the end surface 32 which faces the chamber 22 for a purpose to be described. An annular groove 38 is formed in the body of piston head 30 axially inwardly of end face 32 and shoulder 36 and receives a piston ring element 40 which serves to prevent liquid within chamber 22 by passing the piston 30 during operation of the apparatus which will be described in detail presently. A relatively smaller annular shoulder 42 is provided around the periphery of end surface 34, and the piston head 30 further includes a central axial bore or passage 44 extending from end face 34 along approximately half the axial length of piston head 30 for receiving the end of piston rod 28.

Piston rod 28 preferably is a hardened dowel pin of heat treated alloy steel which can be chrome plated for wear resistance and which is chamfered at the end 46. The rod and piston head are pressed together to form the combination. While a separate rod and piston head combination is preferred, a unitary or integral component could be machined from metal if desired. Also, piston head 30 can have alternative forms, for example it can be provided with additional annular grooves similar to groove 38 spaced axially along the piston head and provided with piston rings.

The apparatus of the present invention further comprises a cylinder head element 50 located within housing 12 axially adjacent the shock tube 20 for performing several functions during operation of the apparatus. The head element 50 is generally solid, cylindrical in shape and has mutually parallel opposite axial end faces 52 and 54. One function of cylinder head 50 is to serve as a bearing for the rod 28, and to this end, head 50 is provided with an axial bore or passage 56 of a size or diameter providing a bearing contact with the rod 28 which extends therethrough. Accordingly, the cylinder head element 50 is of a material having suitable bearing qualities, for example SAE 660 bronze, although other materials of suitable strength and bearing qualities can be employed. Passage 56 includes an enlarged diameter portion 58 extending a relatively small axial distance inward from the end face 54 thereby defining a region into which is fitted a seal element 60 which preferably is of urethane material. Other materials having suitable sealing properties can of course be employed. The seal element 60 functions to keep low pressure liquid from escaping from the apparatus. The cylinder head element 50 also is provided with an annular groove 64 in the outer surface thereof and located approximately midway along the axial length of element 50. Groove 64 contains a conventional o-ring seal 66 which seats in the groove and has sealing contact with the inner surface of housing 12. The O-ring seal element 66 serves to keep hydraulic liquid from bypassing between cylinder head 50 and the inner wall of housing 12 during operation of the device which will be described in detail presently.

The cylinder head element 50 is provided with a relatively large annular recess 70 between groove 64 and the axial end face 52. The recess or groove 70 includes spaced-apart sidewalls disposed in planes which are mutually parallel to the axial end faces 52, 54 and includes an inner wall or surface which is generally concentric with the bore or passage 56. Groove 70 contains an element 72 for absorbing the compression of the hydraulic liquid during operation of the device which will be described in detail presently. Element 72 is generally annular in shape having an axial dimension providing a relatively snug fit in groove 70 and having an outer diameter providing a relatively snug fit against the inner surface of housing element 12. Element 72 preferably is of Buna N closed cellular foam material. The cylinder head element 50 is provided with a reduced diameter portion 74 between groove 70 and the axial end face 52 thereby providing a clearance with respect to the inner surface of housing 12 to expose element 72 to the hydraulic fluid in a manner which will be described.

The apparatus of the present invention further comprises a wiper or scraper element 78 fitted on the rod 28 and which is held in place by a retainer element 80 which, in turn, is positioned between the cylinder head element 50 and the end of housing 12. In particular, the retainer element 80 is of metal such as brass having an outer diameter slightly less than that of cylinder head 50 and an axial length such that one axial end face of retainer 80 abuts or contacts the axial end face 54 of cylinder head 50 and the other end face abuts the crimped or inwardly bent portion of housing 12. As a result, the retainer element 80 is held firmly in place. The retainer element 80 has a through passage including a first diameter portion 82 of a diameter slightly greater than that of rod 28, a second larger diameter portion 84 axially adjacent thereto, and a third intermediate diameter portion 86 adjacent the opposite end face. The body of the wiper or scraper element 78 is fitted in the recess defined by portion 84 between the portions 82 and 86, and the wiper 78 terminates in a relatively sharp edge portion 88 axially outwardly thereof. As rod 28 reciprocates in the apparatus, the scraper or wiper element 78 serves to remove foreign material therefrom to keep the rod 28 clean in a known manner thereby preventing the contamination of the liquid in the apparatus. Element 78 is of urethane material.

The apparatus of the present invention further comprises biasing means in the form of a coil spring 92 within shock tube element 20 and acting on piston head 30 for urging the piston head and rod assembly toward a position at the end of shock tube 20 so as to maximize the volume of chamber 22. One end of coil spring 92 engages piston head 30 at the shoulder 36. Coil spring 92 is retained at the opposite end by means of a head element designated 96 which is located at the opposite end of shock tube element 20. The head element 96 has the general shape of a cylindrical plug but is provided with a flat 100 on a portion of the circumferential surface thereof, and head element 96 is oriented so that the flat 100 is in the position shown in FIGS. 1 and 7 for a purpose to be described. Head element 96 has a first axial end face 102 facing the end of housing 12, i.e. the right-hand end as viewed in FIG. 1, and a bore or recess is provided in this surface along approximately half the axial length of element 96 and terminates in an inner face 104 disposed generally parallel to end face 102. As a result, there is provided a relatively thin, arcuate wall portion 106 which extends around and terminates at each end in the flat surface 100. Other components of the apparatus are received in the recess defined by surface 104 and annular wall 106 in a manner which will be described in detail presently.

Head element 96 includes an intermediate body portion of smaller diameter provided with an annular groove 110 and a relatively small shoulder 112 spaced axially from groove 110. Head element 96 has an axial end face 114 which is exposed to chamber 22 and which terminates at the periphery in an annular shoulder 116 in which the opposite end of spring 92 is seated in a manner similar to shoulder 36 of piston head 30. Head element 96 is provided with a through passage or bore including a first diameter portion 120 leading axially inwardly from surface 104, an intermediate portion and a larger diameter portion 122 terminating at the axial end face 114. A ball element 124 is contained within the intermediate portion and the larger portion 122 and serves as a check valve. The ball is retained by a sleeve element 126 fixed to the surface of the larger diameter portion 122 and spaced from the intermediate portion, the end of the sleeve providing an effective seating surface for the ball in an open position.

Figure 6:
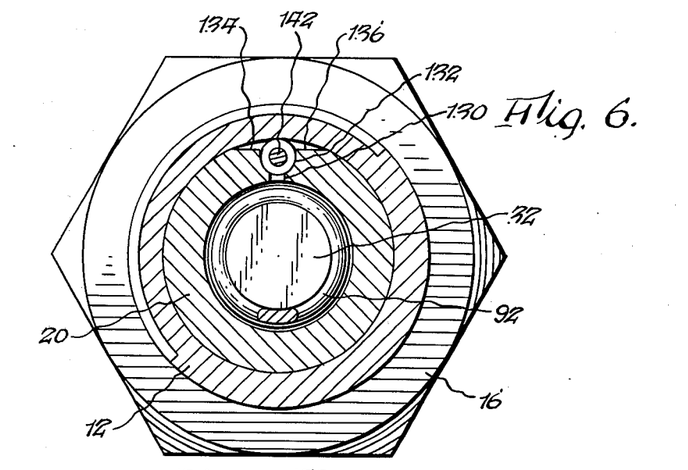
FIG. 6 is a sectional view taken about on lines 6—6 of FIG. 1.

The apparatus of the present invention further comprises means for providing linear deceleration of a moving object applying an impact force to rod 28 throughout the entire stroke or movement of the piston-rod assembly. A plurality of orifice passages or openings 130 are provided in the wall of shock tube element 20 spaced axially in a series therealong. The orifice openings 130 in the present illustration are located along a straight line path parallel to the axis of tube 20. The apparatus of the present invention further comprises means defining an elongated path outwardly of chamber 22 and in fluid communication with orifice openings 130. In particular, an elongated path or track 132 is provided in the outer surface of the shock tube element 20 in communication with the orifices 130. Track 132 is formed by broaching, milling or grinding and is generally semi-circular in cross section, is linear, and is disposed along tube 20 parallel to the longitudinal axis thereof. Track 132 is relatively narrow in width and extends along the entire axial length of tube 20. The peripheral surface of tube 20 in communication with track 132 is provided with coplanar flat surface portions 134, 136 as shown in FIG. 6. A clearance is provided between the flats 134, 136 and the inner wall surface of housing 12 to provide a path for fluid flow in a manner which will be described in detail presently. An aperture or port 138 is provided in tube 20 at one end thereof between the track 132 and the interior of tube 20 for a purpose which will be described.

Figure 4:
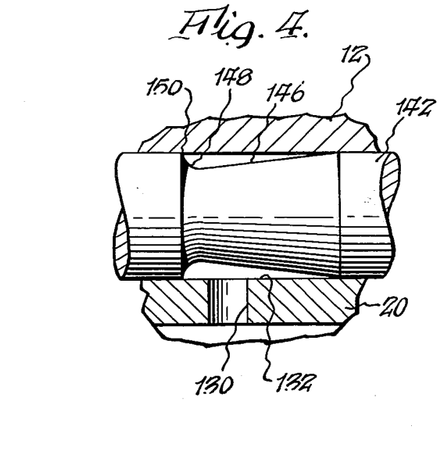
FIG. 4 is an enlarged view of the portion of FIG. 1 outlined by broken lines.
Figure 5:
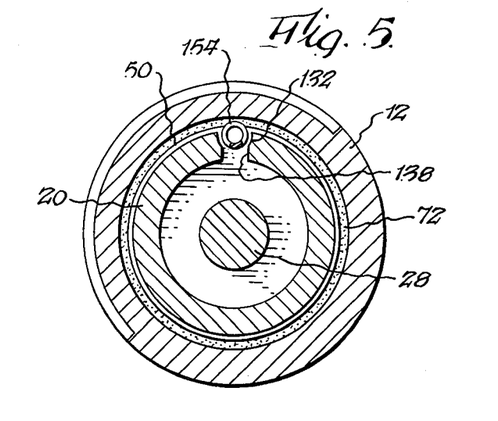
FIG. 5 is a sectional view taken about on line 5—5 of FIG. 2.

The apparatus of the present invention further comprises flow control means including an elongated element adjustably supported in the housing and moveable lengthwise along path 132 in operative relationship with orifice openings 130 to adjust the effective size of openings 130. In particular, a flow control element 142 is movable linearly along path 132 and has formations therein adapted to register with the orifices 130 in a manner controlling the flow therethrough in response to movement of the element 142. Flow control element 142 is in the form of a rod or pin preferably of steel and having a rounded surface at one end, formations axially spaced therealong at locations so as to be in registry with the orifices 130, and a slightly reduced diameter portion at the opposite end thereof. The pin 142 is of sufficient length so that when the first formation is in registry with the orifice at the far left-hand portion of tube 20 as viewed in FIG. 1, the opposite end of pin 142 projects a slight distance axially beyond the opposite end of tube 20 for a purpose to be described. As shown in FIG. 4, each formation includes radially inwardly extending annular surface portion 146 of slightly progressively decreasing diameter in an axial direction which terminates at a curved radially outwardly extending annular surface portion 148 which terminates at an edge or ridge 150 defining a juncture with the outer cylindrical surface of the rod or pin 142. The axial length of surface portion 146 is greater, for example approximately three times greater, than the dimension of each orifice opening 130 in the direction of movement of pin 142. The surface portion 146 defines a relatively small acute angle with respect to the longitudinal axis of pin 142, for example an angle of about seven degrees.

A coil spring 154 is positioned in track 132 between the end of pin 142 and the surface portion of element 50 exposed to the end of track 132. The pin element 142 is movable linearly along track 132 against the bias force of spring 154 by means which now will be described.

The apparatus of the present invention further comprises adjustment means carried by housing 12 and operatively engaging the elongated flow control element 142 for moving element 142 along path 132 to a selected or desired location and including means for maintaining or holding element 142 in such location. In particular, a cylinder end element 160 of generally cylindrical shape is positioned between the element 96 and the end of housing 12. Element 160 has opposite axial end faces 162, 164 and is of a diameter such that it fits relatively snugly within housing 12. Element 160 is of an axial length such that end surface 162 abuts or contacts the end surface 102 of element 96 and the opposite axial end face 164 abuts the crimped or inwardly bent portion of the end of housing 12. Element 160 is provided with an annular groove or recess 166 in the outer surface thereof for receiving an o-ring 168 which has sealing contact with the inner surface of housing 12. Element 160 is provided with a through bore or passage 172 extending along the entire axial length thereof and is provided with another bore or passage 174 extending inwardly from the axial end face 162 to slightly beyond the mid-point of the axial length thereof. The purpose of passage 174 will be described in detail presently.

The apparatus further comprises a cam element 178 rotatably carried in the housing and located generally in the region defined by the annular wall 106 and inner surface 104 of the element 96. Cam element 178 has a cam surface 180 which adjacent the periphery thereof operatively contacts or engages the exposed end of pin element 142. Cam surface 180 is disposed at an angle with respect to the axis of pin 142, so that upon rotation of cam 178 the pin element 142 is moved linearly along path 132 in a manner which will be described in further detail presently. Cam 178 is fixed to one end of an adjustment element having a shaft portion 184 extending through the bore or passage 172 of element 160 and a knob portion 186 which is located outwardly beyond the axial end surface 164 of element 160 so as to be externally available for manual operation in a manner which will be described. Cam 178 can be fixed to the adjustment element in a number of ways, and in the present illustration the shaft portion 184 has a through passage or bore 190 and a reduced diameter end portion having external teeth 191 and which is received in a central bore or passage in the cam element 178 having teeth which lock with teeth 191 whereby cam 178 is fixed to shaft portion 184. The reduced diameter end of portion 184 extends beyond the cam and is flared outwardly as shown in FIG. 1. Other arrangements can of course be employed. Shaft portion 184 also has an annular groove 194 in the outer surface thereof receiving an o-ring 196 which has sealing contact with the bore or passage 172 of element 160.

Figure 3:
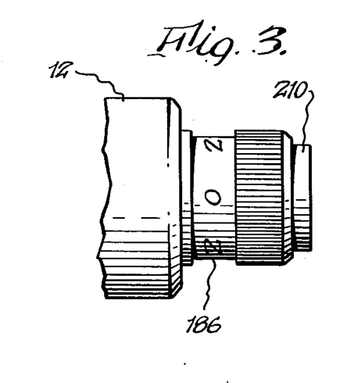
FIG. 3 is a fragmentary elevational view of a manual adjustment knob in the device of FIG. 1.

Cam 178 is provided with a series of recesses or indents 200 spaced circumferentially therearound. A spring-biased detent mechanism is mounted in housing 12 by means of the cylinder end element 160 for selective engagement with the recesses 200 to hold cam 178 in a selected rotational position. The detent mechanism includes a ball element 202 urged by a coil spring 204 in passage 174 into engagement with a selected one of the plurality of recesses 200 which are semispherical in shape to lock the cam in a selected position. The knob portion 186 is provided with a passage 206 in communication with the bore 190 which is sealed by a plug element 210 in combination with an o-ring 208 for a purpose to be described. As shown in FIG. 3, knob 186 is provided with indicia for correlating degree of rotation of the knob with degree of linear movement of flow control element 142.

Figure 2:
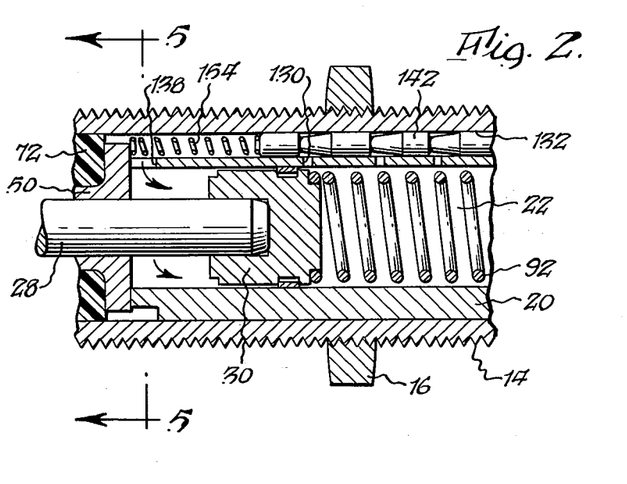
FIG. 2 is an enlarged fragmentary longitudinal sectional view of the device of FIG. 1.

The energy absorbing device 10 of the present invention operates in the following manner. It finds use in a variety of situations, for example in decelerating and stopping machine components, items moving along conveyors and wheeled equipment and vehicles in an industrial plant, to mention just a few. Initially, the device 10 is in the position shown in FIG. 1 with piston head 30 at one end, i.e. the left-hand end, of chamber 22 so that rod 28 is fully extended. Piston 30 is urged toward this position by the biasing spring 92 in chamber 22 which is filled with hydraulic fluid in the form of oil. Hydraulic fluid also is present along path 132, in the region containing coil spring 164 and in the passage or region between path 132 and check valve element 124. Upon application of a force load such as propelling force or impact force to rod 28, piston head 30 begins moving along within chamber 22 toward the other end, i.e. in a direction from left to right in FIG. 1. This movement of piston 30 increases the fluid pressure in chamber 22 thereby seating the check valve ball element 124 to block passage 120 and to force fluid from chamber 22 out through the metering orifices 130. The hydraulic fluid flows around the recessed formations in rod 142 and along the path 132 in a leftward direction as viewed in FIG. 1. Fluid flows from path 132 through port 138 into chamber 22 at the left-hand end as viewed in FIG. 1 and behind or rearwardly of piston head 30 as indicated by the arrows in FIG. 2. Fluid also flows through the clearance or passage between surface 74 of element 50 and the inner surface of housing 12 to compress the closed cell foam material of element 72 which functions as an accumulator. The material of element 72 compresses to approximately 50 percent of its normal volume which compression will equal the volume of hydraulic fluid displaced by piston rod 28.

The resistance to fluid flow through the orifices 130, the effective sizes of which are determined by the locations of the formations in element 142 relative to the orifices as illustrated in FIG. 4, determines the internal operating pressure of the device 10 which, in turn, gives rise to resisting force to decelerate and stop the force load acting on rod 28. Furthermore, this resisting or stopping force is uniform throughout the entire stroke of the piston-rod assembly to provide uniform or linear deceleration of the force load. Such linear deceleration is provided by the spaced metering orifices 130 in tube 20 and which are controlled by element 142 along the direction of movement of piston 30. In particular, as piston 30 is moved along within chamber 22 from one end to the other, i.e. from left to right as viewed in FIG. 1, it progressively blocks the orifice openings 130 thereby progressively decreasing the effective total area of the orifices 130 through which hydraulic fluid leaves chamber 22. The orifice area, in turn, is controlled by the formations along element 142. The foregoing occurs during decrease of the velocity of the moving object which engages rod 28 thereby causing the device to maintain a constant or uniform deceleration or resisting force.

On the return stroke of piston 30 when the force load no longer acts on rod 28, spring 92 causes movement of piston 30 in a direction from right to left as viewed in FIG. 1. Fluid pressure in chamber 22 decreases thereby unseating check valve ball element 124 to open passage 120 i.e. ball 124 engages element 126. Fluid then flows from path 132 into chamber 22 on the right-hand side of piston 30 as viewed in FIG. 1. As spring 92 moves piston further to the left, fluid is forced from chamber 22 out through metering orifices 130 around the formation in rod 142 into path 132 and also through port 138 into path 132. This fluid flows along path 132 and then through passage 120 into chamber 22 on the right-hand side of piston 30. Accumulator 72 expands to release fluid which flows through the passage or clearance and into path 132 and ultimately through passage 120 into chamber 22. The foregoing repositioning of piston 30 to the position shown in FIG. 1 is relatively rapid.

When the device of the present invention is to be used with different force loads having different values of kinetic energy, the effective area or size of the orifices 130 is adjusted to accommodate differences in kinetic energy in the following manner. The flow control element 142 is moved linearly along path 132 to change the positional relationship between the recessed formations and the corresponding metering orifices, control element 142 being moved by manual operation of knob 186 to rotate cam 178. In particular, as rod 142 is moved from right to left as viewed in FIGS. 1 and 4, each metering orifice 130 registers with a progressively increasing diameter portion of annular surface 146 of the corresponding formation. As a result, the effective size of each orifice 130 opening to path 132 is progressively decreased. On the other hand, movement of rod 142 from left to right as viewed in FIGS. 1 and 4 results in each metering orifice 130 registering with a progressively decreasing diameter portion of annular surface 146 in a direction toward surface 148 of the corresponding formation. As a result, the effective size of each orifice 130 opening to path 132 is progressively increased. The provision of identically shaped and dimensioned recessed formations axially spaced along rod 142 causes an adjustment of the effective sizes of orifice openings 130. The effective size of each orifice opening 130 is increased or decreased depending upon the direction of movement of the tapered formation in rod 142 adjacent the orifice. Generally, as the magnitude of the force load applied to rod 28 is increased, adjustment is made to decrease the effective size of the orifice openings 130. By virtue of the foregoing adjustments, the effective load capacity of the energy absorbing device is changed. A true linear deceleration apparatus is provided since a number of orifices 130 can be provided depending upon the stroke length of the apparatus. All of the orifices 130 are changed by the arrangement of the present invention thereby providing true adjustment. Linear deceleration is provided throughout the entire stroke or movement of the piston rod assembly.

The foregoing adjustment is made is a convenient and effective manner by manual operation of knob 186 to rotate cam 178. In the present illustration the axis of rotation of cam 178 is parallel to the axis of linear movement of rod 142. Cam surface 180, which contacts the end of rod 142 adjacent the outer edge or periphery of the cam, is disposed or inclined with respect to the axis of rotation of cam 178 so that the axial dimension or thickness of cam 178 varies in a circumferential direction. Therefore, upon rotation of cam 178 by means of the shaft or knob 186, a surface of changing axial thickness contacts the end of rod 142 with the result that rod 142 is moved linearly along its longitudinal axis in response to rotation of cam 178. During one complete rotation of cam 178, rod 142 is moved first in one direction and then in the opposite direction between two positioned limits. In particular, during rotation of cam 178 from the position shown in FIG. 1 through 180°, rod 142 is moved against the bias force of spring 154 from right to left as viewed in FIG. 1 and during further rotation of cam 178 through the remaining 180°, rod 142 is moved or returned by the force of spring 154 from left to right as viewed in FIG. 1.

The right-hand limit or end of travel of rod 142 as viewed in FIG. 1 is established by the location of cam 178 in housing 12 and the minimum axial distance between the portion of cam surface 180 contacting rod 142 and the opposite axial end surface of cam 178. This axial distance, in turn, is determined by the characteristic, i.e. degree of inclination, of cam surface 180. The left-hand limit or end of travel of rod 142 as viewed in FIG. 1 is established by the maximum axial distance between the portion of cam surface 180 contacting rod 142 and the opposite axial end surface of cam 178, this maximum axial distance being determined by the characteristic, i.e. degree of inclination, of cam surface 180.

Figure 7:
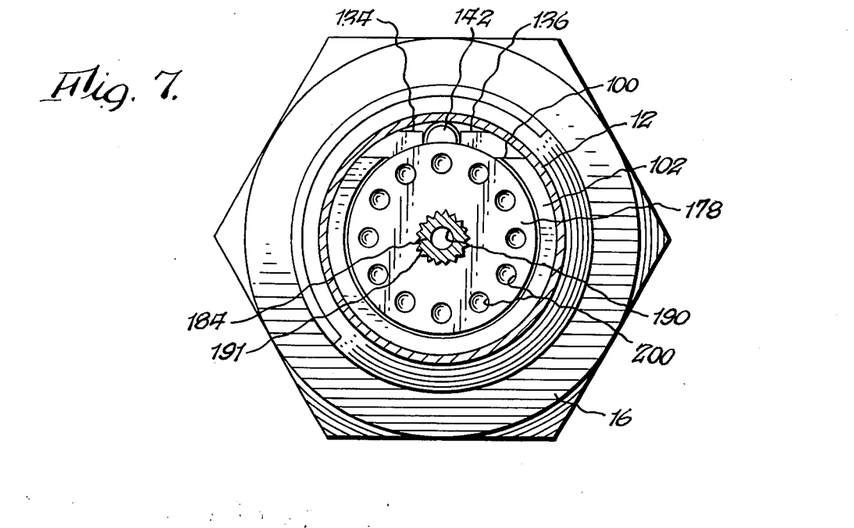
FIG. 7 is a sectional view taken about on line 7—7 of FIG. 1.

Cam 178 is rotated by manual operation of knob 186 and is held in a selected rotational position by selective engagement between the recesses 200 in the cam surface and the detent mechanism comprising ball 202 and spring 204. As shown in FIG. 7, a number of recesses 200 are spaced circumferentially around cam 178 which can be used for different orifice adjustments. As knob 186 is rotated, ball 202 is urged by spring 204 into a corresponding indent or recess 200 to lock or hold the particular adjustment in that position. The foregoing arrangement provides reliable adjustment along with relatively simple and economical construction. As shown in FIG. 3, indicia is provided around knob 186 for correlating degree of rotation of knob 186 with degree of linear movement of the elongated flow control element 142 and thus degree of adjustment in effective size or area of orifices 130. The larger the shock absorbing unit 10, the greater can be the diameter of cam 178 thereby providing a larger number of adjustment settings.

The apparatus of the present invention can be mounted for use in a number of ways, employing various arrangements such as clevis ends, foot mount brackets and welded flanges. The hexagonal nut 16 threaded on tube 12 is used to act as a stop against a threaded attachment.

The apparatus of the present invention also can be included in an air/oil system in which it can be sequenced by a valve so as to absorb the energy on the in stroke of the piston and rod assembly and then be repositioned by signal by allowing air pressure to act in an air/oil tank to push the oil back and reposition the piston and rod assembly. In particular, this is accomplished by removing the foam accumulator element 72, the coil spring 92 and the plug 210 from the apparatus. A conduit leading from an air/oil tank is connected into knob 186 placing the interior of the apparatus including chamber 22 and passage 132 in fluid communication with the air/oil tank. The tank is connected to normal shop air pressure through a one-way check valve and is mounted above the apparatus so as to eliminate aeration of the liquid. The operation of the apparatus is similar to that described hereinabove in that a force acting on rod 28 moving piston 30 to the right as viewed in FIG. 1 forces liquid from chamber 22 through orifices 130 into passage 132. The liquid now flows from passage 132 into the air/oil tank instead of compressing foam element 72 and coil spring 22. Piston 30 then is returned by means of the air pressure against the oil in the air/oil tank. A sequence valve in the air line to the air/oil tank can be employed to control return of the piston and rod assembly. By virtue of the sequence valve, any desired time delay can be included before air pressure is released to the air/oil tank for returning the piston and rod assembly.

Figure 8:
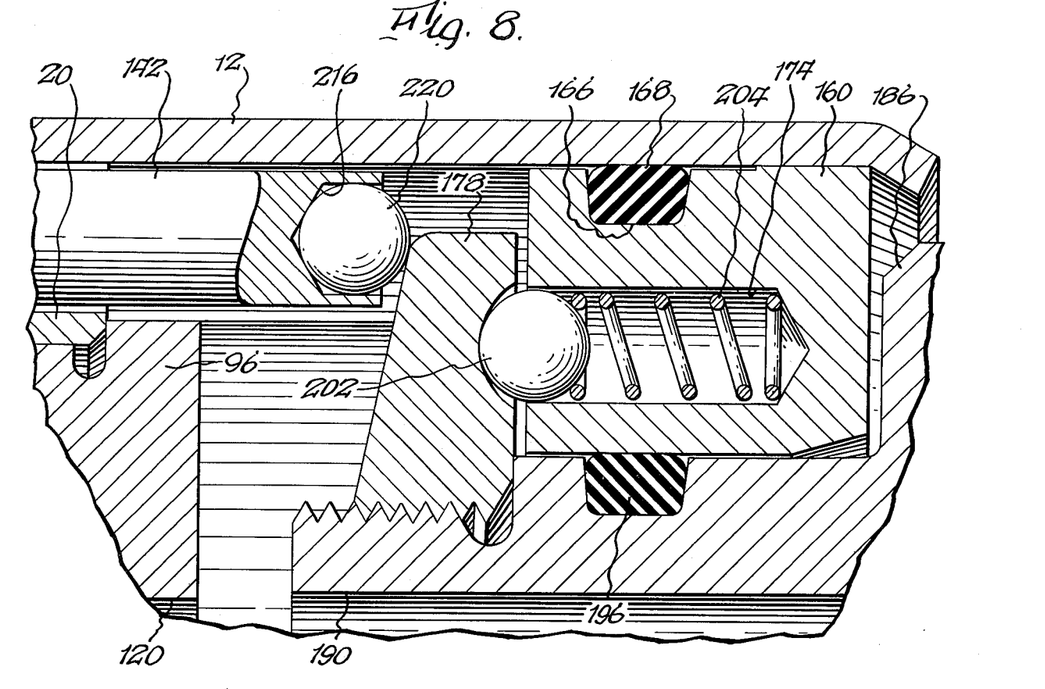
FIG. 8 is an enlarged fragmentary elevational view with parts removed of another embodiment of the present invention.

FIG. 8 illustrates an alternative embodiment of the flow control element 142 which facilitates the co-operative relationship between element 142 and cam 178. The end of the rod-like element 142 adjacent cam 178 is provided with a bore or recess 216 which extends a small distance axially inwardly from the end surface of rod 142. Bore 216 is cylindrical and in the present illustration has a cross-section which occupies a major portion of the cross-section of rod 142. A bearing element in the form of a steel ball 220 is movably seated or received in recess 216 and has a portion extending beyond the end surface of rod 142. Ball 220 contacts the surface of cam 178 and rotates upon movement of cam 178 thereby providing a ball bearing type of operative engagement or contact between cam 178 and rod 142. The diameter of recess 216 preferably is only minutely greater than the diameter of ball 220 so that ball 220 is rotatable but not movable laterally with respect to the longitudinal axis of rod 142. The axial length of recess 216 preferably is of a dimension such that the center of ball 220 is located slightly inwardly of the end of flow control element 142. The provision of bearing element or ball 220 contacting the surface of cam 178 increases the smoothness of the adjustment as cam 178 is rotated by knob 186.

Figures 9, 10:
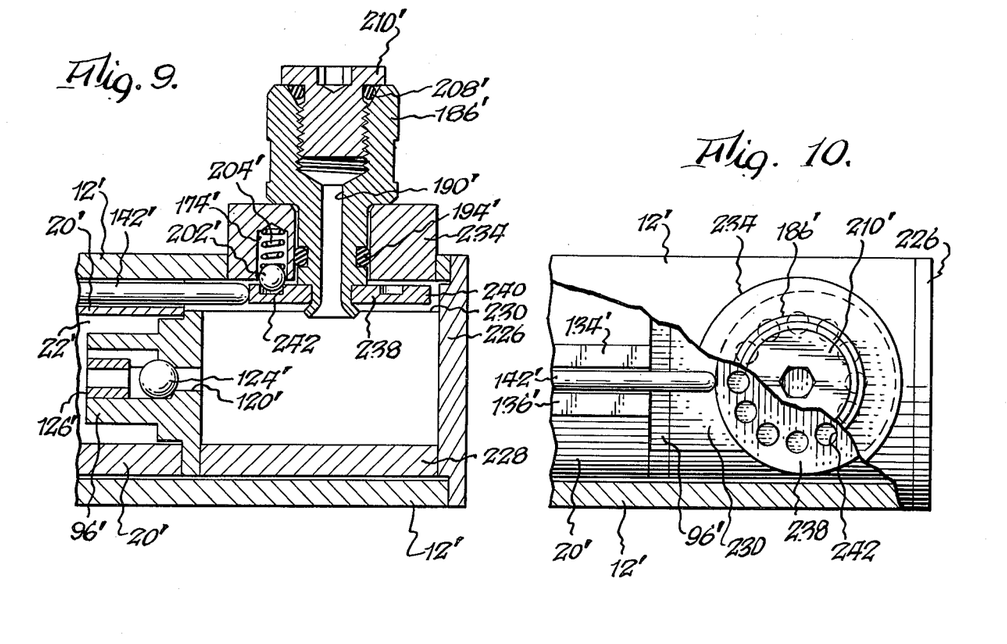
FIG. 9 is a fragmentary elevational view of another embodiment of the present invention.
FIG. 10 is a fragmentary top plan view partly in section of the embodiment of FIG. 10.

FIGS. 9 and 10 illustrate an adjustment arrangement according to another embodiment of the present invention wherein the axis of rotation of the cam is perpendicular to the axis of linear movement of the flow control element. In the embodiment of FIGS. 9 and 10 those elements similar to corresponding elements in the embodiment of FIGS. 1–7 are designated by the same reference numeral provided with a prime superscript. The housing 12' is closed at the end opposite the rod end by a closure cap or disc 226 secured to the housing 12' in a suitable manner. The head element 96' is spaced from closure 226 by a spacer element 228 which is in the form of a sleeve which is open along the entire length at the upper portion as viewed in FIG. 9. The opening is defined by spaced, parallel longitudinal edge surfaces 230 shown in FIGS. 9 and 10. An opening is provided in the wall of housing 12' between closure 226 and the end of flow control element 142', and a holding element 234 is secured in the opening in a suitable manner. Element 234 is similar to the cylinder end element 160 in the embodiment of FIGS. 1–7 and carries a rotatable adjustment knob 186'.

The axis of rotation of knob 186' is perpendicular to the longitudinal axes of housing 12' and flow control element 142'. A cam element 238 is fixed to a reduced diameter end portion of knob 186' in a manner similar to that in FIGS. 1–7. In this embodiment cam 238 is of relatively constant width or thickness and is eccentrically mounted with respect to the axis of rotation of knob 186'. The peripheral surface 240 of the cam operatively contacts the end of flow control rod 142', and upon rotation of knob 186' and cam 238, rod 142' is reciprocated against the biasing force of a coil spring (not shown) similar to coil spring 154 in the embodiment of FIGS. 1–7. Cam 238 is held in a selected rotational position by selective engagement between recesses 242 in the cam surface and a detent mechanism comprising ball 202' and coil spring 204' carried in element 234. Knob 186' also can be provided with indicia as in the embodiment of FIGS. 1–7. The foregoing arrangement is particularly advantageous in large size apparatus where a rear flange mounting is required.

It is therefore apparent that the present invention accomplishes its intended objects. While several embodiments of the present invention have been described in detail, this is for the purpose of illustration, not limitation.

I claim:

1. An adjustable kinetic energy absorbing device comprising:
   a) a housing;
   b) means in said housing including a hollow elongated element defining a chamber for containing hydraulic fluid;
   c) piston means having a portion movable along within said hollow element and a portion for receiving external forces;
   d) a plurality of orifice openings in said hollow element spaced therealong in the direction of movement of said piston means;
   e) means defining an elongated path outwardly of said chamber and in fluid communication with said orifice openings, said path being relatively narrow in width and extending along said hollow element;
   f) means defining a region in said housing in fluid communication with said path for receiving fluid flowing through said orifice openings and along said path; and
   g) flow control means including an elongated element adjustably supported in said housing and movable lengthwise along said path in operative relationship with said orifice openings to adjust the effective size of said openings, said flow control element having surface formations spaced axially therealong and adapted to register with said orifice openings, each of said formations varying in size axially along said element, whereby movement of said flow control element along said path varies the degree of registry between corresponding formations and orifice openings to adjust the effective size of said openings.

2. Apparatus according to claim 1, wherein said orifice openings are along a linear path parallel to the longitudinal axis of said hollow element, said elongated path in communication with said orifice openings is linear and parallel to the longitudinal axis of said hollow element, and said flow control element is linear.

3. Apparatus according to claim 2, wherein said flow control element is in the form of a rod having surface formations axially spaced therealong and adapted to register with said orifice openings whereby movement of said flow control element along said path varies the degree of registry between corresponding formations and orifice openings to adjust the effective size of said openings.

4. Apparatus according to claim 1, wherein said path is provided in the outer surface of said hollow elongated element.

5. Apparatus according to claim 4, wherein said path is linear and extends along the entire length of said hollow element.

6. Apparatus according to claim 1, further including adjustment means carried by said housing and operatively engaging said elongated flow control element for moving said element along said path to a selected location, said adjustment means including means for maintaining said flow control element in said selected location.

7. In a kinetic energy absorbing device including a housing, a chamber in said housing for containing hydraulic fluid, piston means having a portion movable along within said chamber and a portion for receiving external forces, an elongated control element movably mounted in said housing and operative to influence operation of said device as a function of lengthwise movement of said element, and biasing means urging said element to an initial position, means for moving said control element comprising:
   a) shaft means rotatably mounted in said housing;
   b) a cam fixed to said shaft means and positioned with a surface portion thereof operatively contacting said control element whereby upon rotation of said cam said control element is moved lengthwise against the force of said biasing means to influence operation of said device; and
   c) locking means operatively associated with said shaft means for maintaining a selected rotational position of said cam.

8. An adjustable kinetic energy absorbing device comprising:
   a) a housing;
   b) means in said housing including a hollow elongated element defining a chamber for containing hydraulic fluid;
   c) piston means having a portion movable along within said hollow element and a portion for receiving external forces;
   d) a plurality of orifice openings in said hollow element spaced therealong in the direction of movement of said piston means;
   e) means defining an elongated path outwardly of said chamber and in fluid communication with said orifice openings, said path being relatively narrow in width and extending along said hollow element;
   f) means defining a region in said housing in fluid communication with said path for receiving fluid flowing through said orifice openings and along said path;
   g) flow control means including an elongated element adjustably supported in said housing and movable lengthwise along said path in operative relationship with said orifice openings to adjust the effective size of said openings;
   h) said flow control element having surface formations spaced axially therealong and adapted to register with said orifice openings whereby movement of said flow control element along said path varies the degree of registry between corresponding formations and orifice openings to adjust the effective size of said openings, each of said formations including a first portion defined by a gradually decreasing cross-sectional portion of said flow control element and a second portion meeting said first portion and including an abruptly increasing cross-sectional portion of said element.

9. An adjustable kinetic energy absorbing device comprising:
   a) a housing;

b) means in said housing including a hollow elongated element defining a chamber for containing hydraulic fluid;

c) piston means having a portion movable along within said hollow element and a portion for receiving external forces;

d) a plurality of orifice openings in said hollow element spaced therealong in the direction of movement of said piston means, said openings being along a linear path parallel to the longitudinal axis of said hollow element;

e) means defining an elongated path outwardly of said chamber and in fluid communication with said orifice openings, said elongated path being linear and relatively narrow in width and extending along said hollow element parallel to the longitudinal axis of said hollow element;

f) means defining a region in said housing in fluid communication with said elongated path for receiving fluid flowing through said orifice openings and along said elongated path; and g) flow control means including an elongated linear element adjustably supported in said housing and movable lengthwise along said elongated path in operative relationship with said orifice openings to adjust the effective size of said openings, said flow control element being in the form of a rod having surface formations axially spaced therealong and adapted to register with said orifice openings whereby movement of said flow control element along said elongated path varies the degree of registry between corresponding formations and orifice openings to adjust the effective size of said openings, each of said formations including a first annular portion of gradually decreasing diameter inwardly and axially of said rod and a second annular portion meeting said first portion and abruptly increasing in diameter, said second portion being of considerably smaller axial length than said first portion.

10. An adjustable kinetic energy absorbing device comprising:

a) a housing;

b) means in said housing including a hollow elongated element defining a chamber for containing hydraulic fluid, said hollow element contacting the inner surface of said housing;

c) piston means having a portion movable along within said hollow element and a portion for receiving external forces;

d) a plurality of orifice openings in said hollow element spaced therealong in the direction of movement of said piston means;

e) means defining an elongated path outwardly of said chamber and in fluid communication with said orifice openings, said path being provided in the outer surface of said hollow elongated element and being relatively narrow in width and extending along said hollow element;

f) means defining a region in said housing in fluid communication with said path for receiving fluid flowing through said orifice openings and along said path;

g) flow control means including an elongated element adjustably supported in said housing and movable lengthwise along said path in operative relationship with said orifice openings to adjust the effective size of said openings, said elongated element contacting the outer surface of said hollow elongated element including said path and the inner surface of said housing; and h) a passage defined on at least one side of said path to provide a clearance space for the flow of fluid along said elongated element.

11. Apparatus according to claim 10, wherein a passage is defined on each side of said path to provide clearance spaces for the flow of fluid along said elongated element.

12. An adjustable kinetic energy absorbing device comprising:

a) a housing;

b) means in said housing including a hollow elongated element defining a chamber for containing hydraulic fluid;

c) piston means having a portion movable along within said hollow element and a portion for receiving external forces;

d) a plurality of orifice openings in said hollow element spaced therealong in the direction of movement of said piston means;

e) means defining an elongated path outwardly of said chamber and in fluid communication with said orifice openings, said path being relatively narrow in width and extending along said hollow element;

f) means defining a region in said housing in fluid communication with said path for receiving fluid flowing through said orifice openings and along said path;

g) flow control means including an elongated element adjustably supported in said housing and movable lengthwise along said path in operative relationship with said orifice openings to adjust the effective size of said openings;

h) biasing means normally urging said piston means to a position at one end of said chamber;

i) port means adjacent said one end of said chamber for placing said path in fluid communication with said chamber, said port means being closed when said piston means is at the other end of said chamber; and j) passage means adjacent said other end of said chamber for placing said chamber in fluid communication with said path, said passage means including check valve means for allowing fluid flow only from said path to said chamber;

k) whereby in response to application of force said piston means is moved along said chamber toward said other end forcing fluid from said chamber through said orifice openings along said path and through said port means into said chamber at said one end behind said piston means and when said force is no longer applied said biasing means returns said piston means toward said one end of said chamber forcing fluid through said port means along said path through said passage means and check valve means into said chamber at said other end thereof.

13. An adjustable kinetic energy absorbing device comprising:

a) a housing;

b) means in said housing including a hollow elongated element defining a chamber for containing hydraulic fluid;

c) piston means having a portion movable along within said hollow element and a portion for receiving external forces;

d) a plurality of orifice openings in said hollow element spaced therealong in the direction of movement of said piston means;

e) means defining an elongated path outwardly of said chamber and in fluid communication with said orifice openings, said path being relatively narrow in width and extending along said hollow element;

f) means defining a region in said housing in fluid communication with said path for receiving fluid flowing through said orifice openings and along said path;

g) flow control means including an elongated element adjustably supported in said housing and movable lengthwise along said path in operative relationship with said orifice openings to adjust the effective size of said openings;

h) adjustment means carried by said housing and operatively engaging said elongated flow control element for moving said element along said path to a selected location, said adjustment means including means for maintaining said flow control element in said selected location; and i) said adjustment means comprising a cam element rotatably positioned in said housing and having a cam surface operatively contacting said elongated element and means for rotating said cam element whereby in response to rotation of said cam element said flow control element is moved along said path.

14. Apparatus according to claim 13, wherein said cam elements rotating means includes a shaft portion connected to said cam element and a knob portion positioned external to said housing whereby said cam element is rotated manually.

15. Apparatus according to claim 14, further including indicia operatively associated with said knob portion for correlating degree of rotation of said knob portion with degree of movement of said elongated flow control element.

16. Apparatus according to claim 13 wherein said cam element is provided with a series of recesses circumferentially spaced therearound and wherein a spring-biased detent mechanism is mounted in said housing for selective engagement with said recesses to hold said cam element in a selected position.

17. Apparatus according to claim 13, wherein said housing has a longitudinal axis and the axis of rotation of said cam element is generally parallel to said housing axis.

18. Apparatus according to claim 13, wherein said housing has a longitudinal axis and the axis of rotation of said cam element is generally perpendicular to said housing axis.

19. Apparatus according to claim 13 further including a bearing element rotatably carried by said elongated element and contacting said cam surface.

* * * * *